June 3, 1958 C. F. HENDEE ET AL 2,837,656
X-RAY ANALYSIS SYSTEM AND RADIATION DETECTOR
FOR USE IN SUCH SYSTEM
Filed Jan. 31, 1956

INVENTORS
CHARLES F. HENDEE
SAMUEL FINE
BY
AGENT

United States Patent Office 2,837,656
Patented June 3, 1958

2,837,656

X-RAY ANALYSIS SYSTEM AND RADIATION DETECTOR FOR USE IN SUCH SYSTEM

Charles F. Hendee, Hartsdale, and Samuel Fine, New York, N. Y., assignors to North American Philips Company, Inc., New York, N. Y., a corporation of Delaware Application January 31, 1956, Serial No. 562,412

16 Claims. (Cl. 250—53)

This invention relates to systems for the chemical analysis of materials by means of X-radiation, and to detectors of X-radiation for use in such analysis.

One conventional system of analysis employs fluorescent X-ray excitation and is described in U. S. Patent No. 2,449,066. As disclosed therein, the sample or specimen to be analyzed is irradiated with X-radiation of sufficient intensity to cause the several elements in said specimen to produce their characteristic fluorescent radiation. This radiation is then collimated and analyzed, usually by means of a single crystal goniometer. The latter comprises a rotatably-mounted, analyzing crystal positioned to receive the fluorescent radiation from the sample. On an arm of the goniometer coupled to the crystal is mounted a detector, usually a Geiger-Mueller or proportional counter. In operation, rotation of the crystal causes certain selected radiations to be reflected or refracted from the crystal in the direction of the detector. The radiation then traverses the detector window and is absorbed in an ionizable gas filling therewithin, producing a series of electrical pulses in an output circuit representing the intensity of the detected radiation. The angular position of the crystal and detector reltaive to the sample determines the wave length or energy content of the detected radiation. These two bits of information enable the skilled investigator to identify and determine accurately, within less than 1% in the commercially-available equipment, the amounts of the several elements in the sample.

To attain the aforementioned accuracy, a great deal of care is exercised in connection with the construction of the apparatus. For example, the X-ray tube and its associated exciting means are designed to produce a very constant and stable X-radiation. The mechanical construction of the goniometer is carefully adjusted so as to enable the exact angular position of the detector and crystal to be measured to within, for example, one-hundredth of a degree. Further, a detector is chosen whose electrical characteristics are extremely stable and reproducible, so that it will be a precise converter of radiation into electrical information. In sum, precision, stability, and exact reproducibility characterize the various elements of the system and constitute the key to accurate analysis.

The system described above has its drawbacks. In particular, the fluorescent radiation of elements of the periodic table from atomic number 20 to lower numbered elements is of very long wave length. For example, the principal fluorescent radiation from the element calcium ($Z=20$) is about three Angstroms; the principal fluorescent radiation from the element sodium ($Z=11$) is about twelve Angstroms. These very long wave length radiations, commonly known as "soft" X-radiation, are readily absorbed by air and by most other materials. Thus, in order to enable the aforedescribed system to be employed for elements fluorescing in that range of wave lengths, it is essential that the optics of the system, i. e., the path followed by the fluorescent radiation, be made sufficiently X-ray transparent to enable the fluorescent radiation to reach the detector. To this end, it was found advisable to evacuate the optics of the system, or to replace the usual air-path with helium. Thus, a helium path of about 30 cm. in length will transmit approximately 85% of the principal fluorescent radiation of aluminum ($Z=13$), and a concomitantly larger percentage of the harder fluorescent radiation of the higher numbered elements and lower percentage of the softer radiation of the lower numbered elements.

The importance of extending the analysis capabilities of this system to the lower numbered elements will become obvious when one considers the frequency with which one encounters the elements sodium, magnesium, aluminum, silicon, phosphorus, sulphur and potassium in common materials for which analysis would be desirable. For example, substantially all glasses contain silicon and sodium in appreciable amounts. Cements of the various types usually contain sodium, magnesium, silicon and calcium. Further, aluminum-containing alloys are frequently encountered in modern technology.

Even with the foregoing refinements in the X-ray optics, the analysis of fluorescent radiation from atomic elements whose atomic numbers range from 10 to 22 is practically impossible with the known system, due primarily to the fact that the radiation must still traverse a window in the detector before it is capable of producing usable information. The conventional detector employs a thin mica or beryllium window. The thinnest windows of this type presently available which are also vacuum-tight, which is necessary to confine the gas filling within the counter, and, of course, of sufficient mechanical strength, still absorb too much of the soft radiation to enable such detectors to be used in the system. Attempts to reduce the thickness of such windows to reduce their absorption results in the loss of the essential vacuum-tight property. Thus, as far as is known, it is impossible to make a beryllium window which is sufficiently thin not to attenuate soft X-radiation and be also vacuum-tight. The same applies to thin plastic and other metallic films and mica.

However, a window separating and isolating the X-ray optics from the detector gas filling appears indispensable in the system, for the following reason. The gas or vacuum surrounding the X-ray optics must function to transmit theoretically all of the fluorescent radiation generated at the specimen to the detector. The gas filling in the detector, on the other hand, must function to absorb theoretically all of the radiation being transmitted thereto. These requirements cannot be fully satisfied by the same gas; hence, the need arises for the presence of two different gases necessitating some partition or window means. Therefore, it appeared that a fundamental limitation precluded the possibility of extending the use of X-ray analysis to the elements in or near the third period of the periodic table.

The invention is based upon a wholly new approach toward the problem, namely, to employ in the detector an inherently porous, i. e., not gas-tight, window, which can therefore be made sufficiently thin so as to be substantially transparent to soft X-radiation. Thus, gas can pass readily through such a window. Means now may be provided to replenish the escaping gas within the detector to thereby maintain the pressure therein substantially constant. However, these expedients alone are insufficient to ensure the stability and reliability of the detector as a device for converting radiation into electrical energy, which is absolutely necessary if accurate results in the analysis are to be obtained.

As is well known in the art, it is normally quite difficult to manufacture Geiger-Mueller or proportional counters which have stable and reliable electrical characteristics. This stems from the fact that any change, no matter how minute, in the composition of the gas filling or in the nature of the electrode surfaces results in a variation in the electrical characteristics of the counter. Hence, great care must be exercised in the manufacture of such devices to ensure that the electrode surfaces are perfectly clean, completely out-gassed and otherwise satisfactorily conditioned, that the filling is precisely that desired without any undesired impurities, and that these latter two conditions are maintained throughout the usable life of the device. Only so long as these requirements are satisfied is it possible to obtain the highly precise information required in X-ray analysis systems.

The invention is also based upon the new discovery that there exists a way of insuring the stability of the novel detector in the system. Briefly, it consists of passing a predetermined quantity of filling gas continuously through the counter. If the rate of flow of the gas through the counter falls within a specified critical range, it is unexpectedly found that stability of the counter is ensured and that reliable operation from day to day can be obtained. That is to say, if the rate of flow is kept constant and fixed during operation or during successive operations, the counter will produce precisely the same electrical information when excited by a given fluorescent radiation at all times. If the inherent porosity of the window is insufficient to enable the desired flow rate to be maintained, which is usually the case, then a separate outlet port is provided in a wall of the detector. By this means, there was constructed an X-ray analysis system in which the optics were enveloped in helium and a detector was employed through which a counter gas was continuously flowed at a predetermined rate, enabling the extension of use of said system with surprisingly good results to elements in the third period of the periodic table.

The invention will now be described with reference to the accompanying drawing in which.

Figure 1:
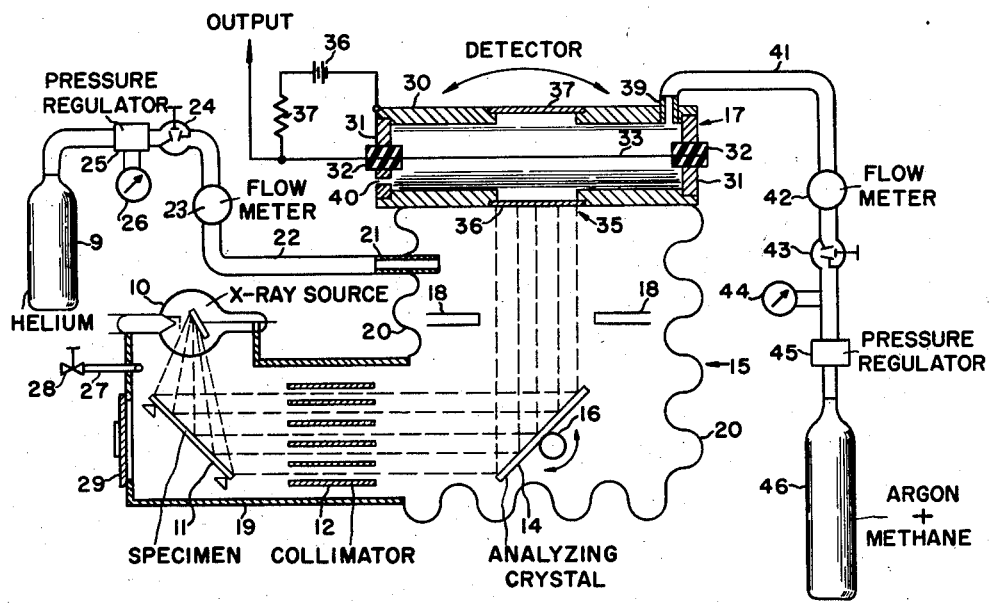
Fig. 1 illustrates, somewhat diagrammatically, one embodiment of an X-ray fluorescent analysis system in accordance with the invention.

Referring now to the drawing, Fig. 1 illustrates one embodiment of an X-ray analysis system in accordance with the invention. It comprises an X-ray source 10, such as the usual high-voltage, X-ray tube. The source 10 is disposed such that the generated X-radiation impinges on a specimen or sample 11 to be analyzed. The specimen 11 is fixedly mounted in the path of the X-radiation. The source 10 is designed such that it is capable of producing radiation of sufficient intensity and energy content to excite all or certain desired elements constituting the specimen 11 into fluorescence. A portion of the fluorescent radiation from the specimen 11 is collimated in a parallel-plate collimator 12 and then impinged on an analyzing single crystal 14 of a goniometer, designated generally as 15. The crystal 14, which may be ammonium di-hydrogen phosphate, is mounted for rotation on a shaft 16 relative to the impinging radiation. In accordance with Bragg's law, certain selected radiations of the fluorescent radiation will be reflected or refracted in the direction of a detector 17. Intermediate the detector 17 and the crystal 14 is a diaphragm 18 providing a limiting aperture. As is well-known in the art, the detector 17 and diaphragm 18 are coupled to the analyzing crystal 14 so as to rotate about the shaft 16 as a center over twice the angular range that the crystal rotates, whereby for each angular increment over which the crystal rotates, the detector 17 undergoes twice said angular increment.

The X-ray optics, which includes the path taken by the X-radiation—commencing with the X-ray source 10, to the specimen 11, through the collimator 12, to the crystal 14, through the diaphragm 18, and finally reaching the detector 17—is surrounded by a housing to enable said path to be constituted by an X-radiation transparent medium. To this end, the fixed elements of the system, namely, the X-ray source 10, specimen 11 and collimator 12, are surrounded by a rigid enclosure 19 which is gas-tight. The movable parts of the system, namely, the crystal 14, diaphragm 18 and detector 17, are surrounded by a flexible, gas-tight envelope 20, for example, of a corrugated neoprene material. Thus, the entire optics of the system are surrounded by a gas-tight enclosure. A door 29 in the side of the housing 19 will provide access to the specimen 11. The end of the enclosure adjacent the detector 17 is provided with an inlet coupling 21, to which is secured a hose 22, the other end of which is coupled in turn to a flow meter 23, a valve 24, a pressure regulator 25 containing an indicator 26, and finally terminates at a supply container 9 of the highly transparent X-radiation medium. Gases which may be used for this purpose are, for example, helium or hydrogen. However, helium is preferred since it is chemically inert and relatively simple to handle, as contrasted to the potentially explosive hydrogen. To the other end of the enclosure is secured a coupling 27 and stopcock 28 by means of which the helium in this case can leave the enclosure. Thus, as will be observed, the helium at a controlled pressure and rate of flow flows slowly through the entire optics of the system, and the pressure may be controlled by the stopcock 28. The helium within the enclosure is preferably maintained at atmospheric pressure or very slightly above atmospheric pressure to ensure that any air within the enclosure will be displaced by the flowing helium. At atmospheric pressure, helium over an optic path of about 30 cm. in length will transmit about 85% of the principal fluorescent radiation of aluminum.

The detector 17 of the system is preferably designed as a proportional counter, so that it will produce electrical information which is energy dependent, with the consequence that discriminating means provided in the output circuit of the counter will enable all but the desired information to be eliminated. In the form shown, the proportional counter 17 comprises a cylindrical cathode 30, for example, of chrome-iron, which also constitutes part of the counter envelope. In recesses formed at opposite ends of the cathode 30 are mounted a pair of supports 31. A pair of feed-through insulators 32, each mounted in the center of one of the supports 31, support therebetween an anode wire 33, which is mounted coaxially with the cathode 30. Entrance for radiation into the detector 17 is afforded by a window 35 in the counter envelope. Between the cathode 30 and anode 33 electrodes is maintained a suitable high potential from a potential source 36, and electrical information derived from the detector is developed in an output circuit 37.

The window 35 comprises an aperture in the wall of the cathode 30, across which is mounted the extremely thin, permeable, window material 36 in accordance with the invention. A preferred material is beryllium, less than one mil thick, which will transmit more than half of the principal fluorescent radiation of aluminum. This material, being so thin, is inherently porous; in fact, pinholes in the material are clearly visible to the naked eye. Other materials which can be used are "mylar" or "formvar" films, trademarked names for thin plastic films. The former is a polyester film, the reaction product of ethylene glycol and terephthalic acid, and the latter is polyvinyl formal. The "mylar" film is commercially available in thickness of 0.00025 inch, while the latter film can be made about 100 Angstroms thin, which will then transmit at least about 75% of the principal fluorescent radiation of aluminum. Such films, while not visibly porous, are nevertheless quite permeable, mainly by diffusion, to the flow of gases therethrough.

As will be observed, the window 35 is located on the side wall of the detector. It is therefore preferred that a second window 37 be provided on the opposite side wall of the detector. The latter serves to enable radiation passing through the input window 35 of the detector and not absorbed in the gas filling to exit from the counter without interacting with the walls. The exit window 37 can also be constructed of a thin, X-ray transparent material, such as that employed in connection with the input window 35, or, in the alternative, it may be constituted of thicker materials.

A coupling 39 is provided at one end of the detector 17 by which a gas can be introduced therein. At the opposite end of the detector is provided an aperture 40 of given size. Thus, gas introduced at the right-hand end of the counter 17 slowly flows through the counter past the windows and finally exits at the aperture 40 at the opposite end. The gas supply means includes a hose 41 coupled in turn to a flow meter 42, a needle valve 43 and pressure indicator 44, a pressure regulator 45 and finally a tank or other supply 46 of counter gas. Any filling gas may be used for the detector so long as it will absorb the soft X-radiation entering the detector. So, for example, rare gases as argon and neon are usable. Another gas which may be used is, for example, nitrogen. If desired, a quench may be included. Suitable quenches may be a halogen, carbon dioxide or a conventional organic quench, such as methane, isobutane, or alcohol. A preferred combination is 90% argon and 10% methane. For a detector path length of about 2 cm., this preferred combination will absorb about 99% of the principal fluorescent radiation of aluminum.

The various elements in the gas supply means are provided to enable the flow rate and pressure of the gas in the counter to be precisely determined. The pressure regulator 45 provides a constant gas pressure, measured by the indicator 44, to the needle valve 43. To ensure a constant rate of flow, the needle valve contains a predetermined orifice against which a constant pressure is maintained. This rate of flow is measured by the flow rate meter 42.

Since the very thin windows on the detector employed in the invention are extremely fragile, it is essential that the gas pressures maintained on opposite sides thereof be substantially the same. Thus, if other than atmospheric pressures are employed in the optics and the detector, care must be taken to ensure that the pressures on opposite sides of the window are substantially identical. However, for convenience and ease of operation, atmospheric pressure of the helium on one side of the window is maintained, and the counter gas on the other side of the window is also maintained at atmospheric pressure. Thus, the very thin and fragile window is not subjected to undue pressures leading to possible fracture. In the event that fracture actually does occur, the window can be readily replaced. As will be obvious, since the window itself is not gas-tight, care need not be taken that any of the joints of the several parts of the counter also be gas-tight. For example, the several elements need merely be cemented together. The window 36, likewise, can be simply cemented in place with, for example, "glyptal," a trademark for an alkyd adhesive. If fracture occurs, the window can be removed and another merely substituted in its place without any special efforts being required, which is an important advantage of the construction of the invention.

During operation of the system of the invention, helium continuously flows through the X-ray optical path reducing to a minimum the absorption of the fluorescent radiation therein. Simultaneously, the counter gas flows slowly and continuously through the counter at a predetermined rate and at a constant pressure. One of the truly surprising and unexpected results of the invention is the discovery that with this arrangement, the electrical characteristics of the detector are stabilized and made reproducible. It was found that so long as the flow rate of the counter gas was maintained within a critical range, the results required of the invention could be obtained.

Figure 2:
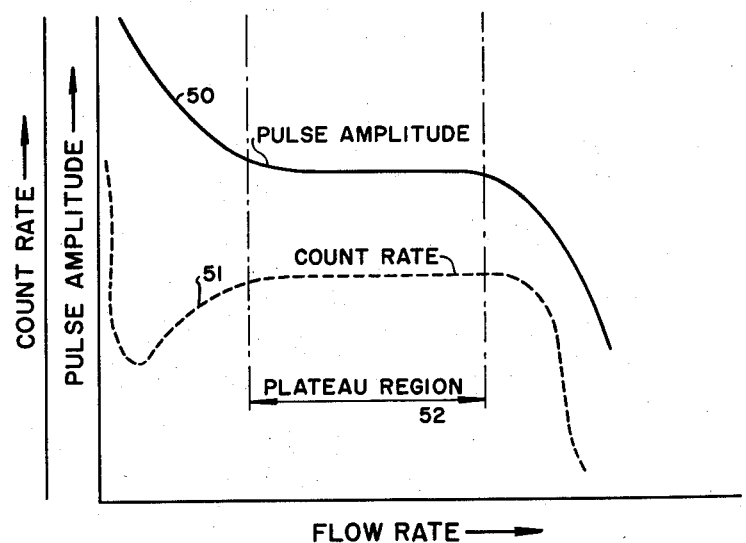
Fig. 2 shows curves correlating the sensitivity of the detector in the system of Fig. 1 with respect to the rate of flow of gas therethrough.

Fig. 2 illustrates this aspect of the invention. The solid line curve 50 in the graph shown in Fig. 2 represents the amplitude of pulses produced by a specified detector in the system described in Fig. 1 correlated to the flow rate of a specific counter gas therethrough. In this particular case, the counter had a length of about 8 cm. and a diameter of about 2 cm., constituting a total volume of about 24 cubic cm. The applied potentials was about 1650 volts. The input coupling 39 had an inside diameter of about 3 mm., and the exit aperture 40 a diameter of about 1.75 mm. The abscissa is the rate of flow in cubic feet per hour of a mixture of 90% argon and 10% methane at atmospheric pressure through the counter. A single radiation equivalent to that produced by aluminum (1.5 kev) was directed through a less than one mil beryllium window into the counter. The dotted line curve 51 was obtained under the same conditions, but, in this case, the ordinate represents the counting rate of the pulses produced by the detector.

As will be observed from the flow rate curves in the graph, there exists a "plateau" 52 along the center of the curve along which the amplitudes of the pulses and the counting rate are stabilized. This represents a stable and reproducible region of electrical characteristics. So long as the flow rate is controlled within the limits of this plateau, then the counter will always produce the same electrical information when excited by a given soft X-radiation. The existence of this plateau, heretofore unknown in the art, is considered one of the most important features of the invention, and the essential characteristic enabling a detector of this type to be employed in the X-ray analysis system of the invention and produce the very accurate results desired. It will be realized that the availability of commercial equipment to select an exact rate of flow or pressure of the counter gas, or to reproduce with exactitude the operating conditions that existed on a previous day or hour is extremely limited, and its cost prohibitive. The presence of the plateau 52 means that normal changes in the flow rate or applied potentials or ambient temperature and humidity conditions will not introduce any errors in the electrical information produced by the detector of the invention.

For the particular detector above-described, the preferred flow rate was about 1.5 cubic feet per hour. This was the equivalent of about three volume changes per minute of the gas within the counter. Satisfactory results were also obtained when the flow rate varied between about one and five volume changes per minute. As will be observed from the curves, the amplitudes of the pulses and the counting rates vary as the flow rate falls below a lower limit or is raised above an upper limit. The exact points at which this occurs have been found to depend on the dimensions of the counter and the porosity of the window 35. Since the window 35 is porous, there will be an intermingling of the two gases on opposite sides. In particular, the counting gas will appear in the X-ray optics and helium will diffuse into the counter. Simultaneously, other gases such as air may be penetrating the system through the various openings provided therein. Also, the electrical discharges in the counter itself will cause outgassing of the electrodes and decomposition of the counter gas, thereby producing various impurity gases. All of these factors tend to produce changes in the electrical information produced by the counter. However, within the plateau region 52 illustrated in the drawing, a sort of perfect compensation or equilibrium is established in which the counter is stabilized and enabled to produce continuously the same information under the same excitation conditions.

The existence of this plateau has also been found with counters whose dimensions are quite different from that described above and also for various types of counter gases. For example, similar results were obtained with a counter having dimensions about three times that of the specific counter described above. In another case, the cathode was rectangular in form, rather than cylindrical. The same results were also obtained with neon and methane as the counter gas. It has therefore been found that the principles of operation described above are present in most forms of this flow type of counter for some range of flow rates.

While the invention has been described in connection with an X-ray system of the fluorescent analysis type, it will be evident that the principles enunciated above are equally applicable to any system wherein very soft X-radiation needs to be accurately detected. Thus, for example, an analysis system involving absorption may employ the invention. In the latter case, the specimens analyzed might be biological specimens, which would require a source of soft X-radiation. Again, a helium path could be employed to reduce the absorption of the X-radiation in the optics of the X-ray system, and a detector with a counter gas flowing continuously therethrough in accordance with the invention may be employed to detect the soft X-radiation. Other examples of systems in which the invention might be employed are those designed for particle size determination by small angle diffraction.

Similarly, the detector of the invention need not be a proportional counter, but could also be operated in the Geiger region, as a Geiger counter, or as an ionization detector. In the latter case, the output circuit of the counter would contain a current measuring device to measure the ionization produced within the counter by the impinging radiation. Likewise, it will be appreciated that impinging fluorescent radiation can enter the counter through one end, to produce a so-called end-window counter, as contrasted to the embodiment employed to illustrate the invention known as a side-window counter.

In general, then, while we have described our invention in connection with specific embodiments and applications, other modifications thereof will be readily apparent to those skilled in this art without departing from the spirit and scope of the invention as defined in the appended claims.

What is claimed is:

1. A radiation detector adapted to detect soft X-radiation, comprising an envelope, electrodes in said envelope, means forming part of said envelope allowing soft X-radiation to pass therethrough, said soft X-radiation-allowing means being porous to gases, and means for continuously passing through said envelope an ionizable gas capable of absorbing soft X-radiation.

2. A radiation detector adapted to detect soft X-radiation, comprising an envelope, a pair of electrodes in said envelope, an X-ray transparent window in said envelope allowing soft X-radiation to pass therethrough, said window being exceedingly thin and porous to gases, and means for continuously passing through said envelope at a predetermined rate of flow and constant pressure an ionizable gas capable of absorbing soft X-radiation, said gas passing between said electrodes.

3. A radiation detector adapted to detect soft X-radiation, comprising an envelope, a pair of electrodes in said envelope, a window in said envelope transparent to soft X-radiation, said window being exceedingly thin and gas-permeable, and means for continuously passing through said envelope an ionizable gas capable of absorbing soft X-radiation and at constant pressure and within a range of flow rates whereby said detector operates in a stable region of its flow rate discharge characteristic.

4. A radiation detector adapted to detect soft X-radiation, comprising an envelope, a cylindrical cathode and concentric wire-like anode in said envelope, a soft X-ray transparent window in the envelope allowing passage of the radiation to an area within the counter between the electrodes, said window being less than one mil in thickness and gas-permeable, gas inlet and outlet means coupled to said envelope, and means for supplying continuously an ionizable, soft-X-ray-absorbing gas to said inlet means to cause said gas to flow at atmospheric pressure and at a predetermined rate of flow through said envelope and through said area between said electrodes, said predetermined rate of flow lying within a plateau region of the flow rate discharge characteristic of the detector, whereby the detector produces stable and reproducible electrical information correlated to impinging X-radiation.

5. A radiation detector as set forth in claim 4, wherein the window is of thin beryllium and the X-ray absorbing gas is selected from the group consisting of neon and argon.

6. A radiation detector as set forth in claim 4, wherein the window is a thin plastic film and the X-ray absorbing gas is selected from the group consisting of neon and argon.

7. A radiation detector as set forth in claim 4, wherein the X-ray absorbing gas consists essentially of 90% argon and 10% methane.

8. A radiation detector as set forth in claim 4 wherein the rate of flow of the X-ray absorbing gas is between one and five envelope volumes per minute.

9. In an X-ray analysis system, the combination comprising X-ray optical means wherein soft X-radiation is generated, a soft X-radiation transparent medium in said optical means to minimize the absorption of soft X-radiation therein, and a radiation detector in said medium for detecting said soft X-radiation, said detector comprising a porous, exceedingly thin, soft X-radiation transparent window, and means for continuously passing at a predetermined rate of flow soft X-radiation absorbing counter gas through said detector.

10. In an X-ray analysis system, the combination comprising X-ray optical means wherein soft X-radiation is generated, a gas-tight enclosure surrounding said optical means, a soft X-radiation transparent first gas in said enclosure to minimize the absorption of soft X-radiation therein, and a radiation detector in said first gas for detecting said soft X-radiation, said detector comprising electrodes and a gas-permeable, less than one mil thick, soft X-radiation transparent window, gas inlet and outlet means coupled to said detector, and means coupled to said inlet means for continuously passing at a predetermined rate of flow a soft X-radiation absorbing second gas through said detector, said second gas being different from said first gas, but being at the same pressure, said rate of flow lying within a plateau region of the flow rate discharge characteristic of the detector.

11. In an X-ray analysis system, the combination comprising means for generating soft X-radiation, helium at atmospheric pressure in the path of said soft X-radiation to minimize the absorption of said soft X-radiation, and a radiation detector for detecting said soft X-radiation, said detector comprising a porous, exceedingly thin, soft X-radiation transparent window contacting said helium, and means for continuously passing at atmospheric pressure and at a predetermined rate of flow soft X-radiation absorbing counter gas through said detector, said rate of flow having a value at which the detector operates in a stable region of its flow rate discharge characteristic.

12. An X-ray analysis system as set forth in claim 11 wherein the counter gas is selected from the group consisting of neon and argon.

13. An X-ray analysis system as set forth in claim 12 wherein the window is a thin, plastic film less than one mil in thickness, and the counter gas consists essentially of 90% argon and 10% methane.

14. In an X-ray spectral analysis system, the combination comprising an optical path including a specimen containing elements which fluoresce in soft X-radiation, means for impinging X-radiation on said specimen to fluoresce said elements, means including a single crystal for selectively redirecting certain of said soft X-radiations, a gas-tight enclosure surrounding said optical path, helium at atmospheric pressure in said enclosure to minimize the absorption of soft X-radiation therein, and a radiation detector in said enclosure for detecting said redirected soft X-radiations, said detector comprising electrodes and a porous, exceedingly thin, soft X-radiation transparent window, gas inlet and outlet means coupled to said detector, and means coupled to said inlet means for continuously passing at atmospheric pressure and at a predetermined rate of flow soft X-radiation absorbing counter gas through said detector, said rate of flow having a value at which the detector operates in a stable region of its flow rate discharge characteristic.

15. A system as set forth in claim 14, wherein the window is less than one mil in thickness, and the counter gas is argon.

16. A radiation detector as claimed in claim 3, wherein the window is a thin polyester film.

References Cited in the file of this patent

UNITED STATES PATENTS

| | | |
|---|---|---|
| 2,489,436 | Salisbury | Nov. 29, 1949 |
| 2,602,142 | Meloy | July 1, 1952 |
| 2,709,751 | Meyer | May 31, 1955 |

OTHER REFERENCES

Sugihara et al.: "Large Thin-Wall Geiger Counter," The Review of Scientific Instruments, XXIV (July 1953), 7, pp. 511–512.